(12) United States Patent
Matsumoto et al.

(10) Patent No.: US 7,990,039 B2
(45) Date of Patent: Aug. 2, 2011

(54) LIQUID CRYSTAL DISPLAY DEVICE WITH COLD CATHODE FLUORESCENT LAMP HAVING PHOSPHOR FILM

(75) Inventors: Yuko Matsumoto, Onjuku (JP); Hidetsugu Matsukiyo, Chiba (JP); Emiko Hayakawa, Kyonan (JP)

(73) Assignee: Hitachi Displays, Ltd., Chiba (JP)

( * ) Notice: Subject to any disclaimer, the term of this patent is extended or adjusted under 35 U.S.C. 154(b) by 382 days.

(21) Appl. No.: 12/166,348

(22) Filed: Jul. 2, 2008

(65) Prior Publication Data

US 2009/0009692 A1    Jan. 8, 2009

(30) Foreign Application Priority Data

Jul. 4, 2007    (JP) .................................. 2007-176469

(51) Int. Cl.
*H01J 61/35*    (2006.01)
*H01J 63/04*    (2006.01)

(52) U.S. Cl. ......... 313/485; 313/631; 313/635; 313/113

(58) Field of Classification Search .................. 313/113, 313/631, 485; 349/70
See application file for complete search history.

(56) References Cited

U.S. PATENT DOCUMENTS

| | | | | |
|---|---|---|---|---|
| 5,811,924 A * | 9/1998 | Okumura et al. | ............. | 313/487 |
| 7,199,523 B2 * | 4/2007 | Matsuo et al. | ................ | 313/636 |
| 7,622,867 B2 * | 11/2009 | Chen | .............................. | 313/634 |
| 2002/0057059 A1 * | 5/2002 | Ogishi et al. | .................. | 313/636 |
| 2002/0125518 A1 * | 9/2002 | Haneder et al. | ................ | 257/295 |
| 2006/0076895 A1 * | 4/2006 | Wada et al. | .................. | 313/635 |
| 2007/0002584 A1 * | 1/2007 | Cho, III | ........................ | 362/606 |
| 2007/0057612 A1 * | 3/2007 | Hsu et al. | ...................... | 313/113 |
| 2007/0138934 A1 * | 6/2007 | Goto | .............................. | 313/491 |

FOREIGN PATENT DOCUMENTS

JP    2001176446 A  *  6/2001

* cited by examiner

*Primary Examiner* — Sikha Roy
(74) *Attorney, Agent, or Firm* — Antonelli, Terry, Stout & Kraus, LLP.

(57) ABSTRACT

A cold cathode fluorescent lamp for a backlight of a liquid crystal display device includes a light-transmitting glass tube in which a rare gas and mercury are sealed, and a phosphor film which is formed on an inner peripheral surface of the glass tube. The phosphor film is formed such that a phosphor suspension is formed by mixing phosphors into a suspension produced by strongly stirring a mixed solvent made of butyl acetate and nitrocellulose and by re-stirring the mixture, and the phosphor suspension is applied to the inner peripheral surface of the glass tube by coating.

10 Claims, 9 Drawing Sheets

—— Strong Mixed Solvent
—— Strong Mixed Slurry
---- Commonly Mixed Solvent
---- Commonly Mixed Slurry FIG. 12
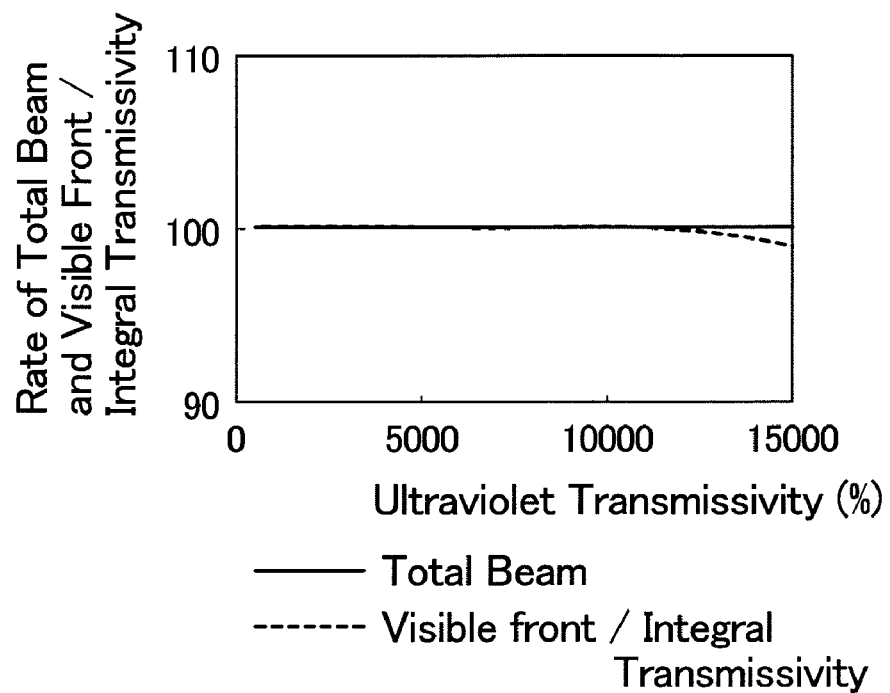
FIG. 13A   FIG. 13B
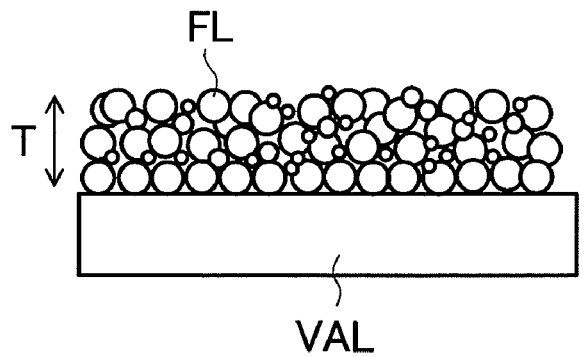
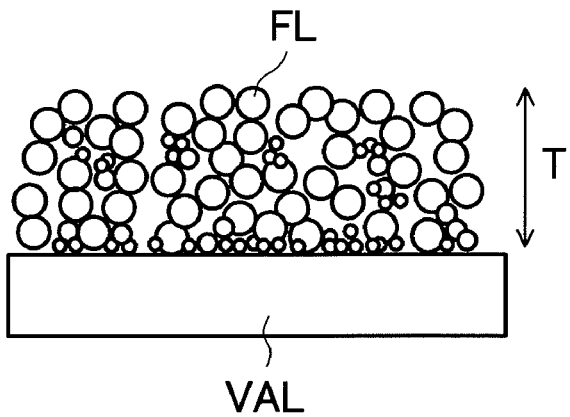

LIQUID CRYSTAL DISPLAY DEVICE WITH COLD CATHODE FLUORESCENT LAMP HAVING PHOSPHOR FILM

BACKGROUND OF THE INVENTION

1. Field of the Invention

The present invention relates to a liquid crystal display device which uses a cold cathode fluorescent lamp as a light source, and more particularly to the light emission efficiency improving structure of a phosphor film formed on an inner peripheral surface of the cold cathode fluorescent lamp and a manufacturing method of the phosphor film.

2. Description of the Related Art

In an image display device which uses a non-light-emitting-type liquid crystal display panel, an electronic latent image formed on the liquid crystal display panel is visualized with the provision of an external illumination means. With respect to the external illumination means, an illumination device is arranged on a back surface or a front surface of the liquid crystal display panel except for the structure which uses a natural light. The display device which requires particularly high brightness adopts, as a mainstream, the structure which mounts an illumination device on the back surface of the liquid crystal display panel. This structure is referred to as "backlight".

The backlight is roughly classified into a side-edge-type backlight and a direct-type backlight. The side-edge-type backlight adopts the structure in which a linear light source represented by a cold cathode fluorescent lamp is arranged along a side edge of a light guide plate formed of a transparent plate. The side-edge-type backlight has been popularly used in a display device for a personal computer which is requested to satisfy a demand for the reduction of thickness thereof or the like. On the other hand, in a large-sized liquid crystal display device such as a display monitor or a display device used for a television receiver set, the direct-type backlight is popularly used. The direct-type backlight adopts the structure in which an illumination device is arranged directly below a back surface of the liquid crystal display panel.

In the general cold cathode fluorescent lamp used in this type of illumination device, a pair of cathodes is respectively arranged at both end portions of a light-transmitting glass tube, a phosphor film is formed on an inner peripheral surface of the glass tube by coating, and mercury and a rare gas are sealed in the inside of the glass tube. By generating an electric discharge in the inside of the glass tube, ultraviolet rays mainly having a wavelength of approximately 254 nm are generated by excitation radiation of mercury thus exciting phosphors with the ultraviolet rays whereby visible light is radiated leading to the acquisition of a luminous flux formed of emitted light.

SUMMARY OF THE INVENTION

This type of phosphor film is formed by controlling a particle size of phosphors, a film thickness or the like such that the maximum light emission brightness can be acquired. For example, a phosphor suspension which is formed by dispersing phosphors having a particle size of approximately 2 μm to 5 μm and a plurality of dispersing agents in a solution is applied by suction to the inside of the glass tube thus forming a phosphor film having a film thickness of approximately 15 μm to 40 μm.

However, out of the ultraviolet rays generated from mercury in the inside of the cold cathode fluorescent lamp, a rate of ultraviolet rays which do not contribute to the emission of light from the phosphors, reach the glass tube through gaps formed between phosphor particles and are absorbed in the glass tube, and are radiated to the outside of the glass tube is approximately 10% to 15% thus lowering light emission efficiency due to such ultraviolet rays.

Further, to observe the distribution of the phosphor particles in the phosphor film using a microscope, an aggregate which is formed by gathering relatively small phosphor particles is observed. It is considered that a large number of gaps is present among the phosphor particles and hence, the ultraviolet rays do not contribute to the light emission and easily pass through the phosphor film. Further, when the large number of gaps is present among the phosphor particles, a film strength is lowered thus giving rise to a drawback that the phosphor film is easily peeled off.

The present invention has been made to overcome the above-mentioned drawbacks of the related art, and it is an object of the present invention to provide a liquid crystal display device which can enhance the brightness of a backlight of a liquid crystal display panel such that the light emission efficiency of the phosphor film is improved by lowering ultraviolet-ray transmissivity attributed to a phosphor film and hence, the light-emission brightness of the phosphor film is efficiently increased whereby a luminous flux quantity of a cold cathode fluorescent lamp can be increased. It is also an object of the present invention to provide a manufacturing method of such a liquid crystal display device.

To achieve the above-mentioned object, the liquid crystal display device of the present invention includes a liquid crystal display panel which is configured to sandwich a liquid crystal layer between a pair of light-transmitting substrates which forms electrodes for forming pixels on inner surfaces thereof, a backlight which includes at least one cold cathode fluorescent lamp which radiates illumination light to the liquid crystal display panel, an optical compensation sheet stacked body which is interposed between the liquid crystal display panel and the backlight, and a frame which houses the liquid crystal display panel and the backlight, wherein the cold cathode fluorescent lamp includes a light-transmitting glass tube in which a rare gas and mercury are sealed, a pair of cold cathodes which is respectively sealed and arranged in both end portions of the glass tube such that the cold cathodes face each other in an opposed manner, an electricity supply line which has one end thereof connected to the cold cathodes and another end thereof led out to the outside of the glass tube in a hermetically sealed manner, and a phosphor film which is formed on an inner peripheral surface of the glass tube, and the phosphor film is formed such that a phosphor suspension is formed by mixing phosphors into a suspension produced by strongly stirring a mixed solvent made of butyl acetate and nitrocellulose and by re-stirring the mixture, and the phosphor suspension is applied to the inner peripheral surface of the glass tube by coating.

Another liquid crystal display device according to the present invention is, in the above-mentioned constitution, preferably characterized in that an ultraviolet-ray reflection film is interposed between the inner peripheral surface of the glass tube and the phosphor film.

Further, another liquid crystal display device according to the present invention is, in the above-mentioned constitution, preferably characterized in that the ultraviolet-ray reflection film has a coating length thereof on the inner peripheral surface of the glass tube in the tube-axis direction set larger than a coating length of the phosphor film on the inner peripheral surface of the glass tube in the tube-axis direction.

Another liquid crystal display device according to the present invention is, in the above-mentioned constitution, preferably characterized in that the ultraviolet-ray reflection film is made of a material having a band gap of 5 eV or more.

Further, a manufacturing method of the liquid crystal display device according to the present invention is characterized in that the phosphor film is formed such that a solvent prepared by mixing butyl acetate and nitrocellulose is strongly stirred, phosphors and binder are mixed into the solvent, and the solvent is re-stirred thus forming a phosphor suspension, and the phosphor suspension is applied to the inner peripheral surface of the glass tube by suction, and is dried by heating.

According to the liquid crystal display device of the present invention, the cold cathode fluorescent lamp is formed in a state that the phosphor film is formed on the inner peripheral surface of the glass tube with high filling density and hence, it is possible to largely reduce ultraviolet-ray transmissivity of the phosphor film whereby the high-brightness light emission can be acquired from the cold cathode fluorescent lamp. Accordingly, the cold cathode fluorescent lamp can acquire extremely excellent advantageous effects including the enhancement of the brightness necessary for the backlight of the liquid crystal display panel and the contribution to the reduction of electric power (low electric power) with the same brightness.

Further, according to another liquid crystal display device of the present invention, in the cold cathode fluorescent lamp, by interposing the ultraviolet-ray reflection film between the inner peripheral surface of the glass tube and the phosphor film, the ultraviolet rays which are radiated to the outside passing through the phosphor film are reflected on the ultraviolet-ray reflection film and hence, the ultraviolet rays are radiated to the phosphor film again. Accordingly, the emission light of the phosphor film is increased and hence, a luminous flux quantity of the cold cathode fluorescent lamp can be further increased whereby the cold cathode fluorescent lamp acquires an extremely excellent advantageous effect that the brightness of the cold cathode fluorescent lamp which constitutes the backlight of the liquid crystal display panel can be enhanced.

Further, according to the liquid crystal display device of the present invention, it is possible to acquire the extremely excellent advantageous effects including the manufacture of the uniform cold cathode fluorescent lamp due to the decrease of the chrominance in the tube-axis direction of the cold cathode fluorescent lamp, and the stability of quality due to the reduction of a peeling-off defect attributed to shock which occurs during shipping, transportation or the like of the liquid crystal display device.

Further, according to the liquid crystal display device of the present invention, it is also possible to acquire the extremely excellent advantageous effects including the large reduction of product cost due to the enhancement of ability of the cold cathode fluorescent lamp, the reduction of a material cost and the like.

Further, according to a manufacturing method of the liquid crystal display device of the present invention, the cold cathode fluorescent lamp is formed in a state that the phosphor film is formed on the inner peripheral surface of the glass tube with high filling density and hence, it is possible to reduce ultraviolet-ray transmissivity of the phosphor film whereby a luminous flux quantity of the cold cathode fluorescent lamp can be increased. Accordingly, the cold cathode fluorescent lamp can acquire an extremely excellent advantageous effect that the brightness necessary for the backlight of the liquid crystal display panel can be easily enhanced.

BRIEF DESCRIPTION OF THE DRAWINGS

FIG. 5A and FIG. 5B are schematic views showing a state of phosphors in a phosphor suspension, wherein FIG. 5A shows of the state of phosphors in a product of the present invention, and FIG. 5B shows the state of phosphors in a conventional product;

FIG. 12 is a view showing the relationship between the brightness of a cold cathode fluorescent lamp and visible light positive transmissivity/integral transmissivity (film thickness: approximately 12 μm) of a phosphor film;

FIG. 13A and FIG. 13B are enlarged cross-sectional views of an essential part for observing the distribution of phosphor particles using a microscope, wherein FIG. 13A shows a cross section of a product of the present invention, and FIG. 13B shows a cross section of a product of the conventional product;

DESCRIPTION OF THE PREFERRED EMBODIMENTS

Hereinafter, specific embodiments of the present invention are explained in conjunction with drawings showing embodiments.

Embodiment 1

Figure 1:
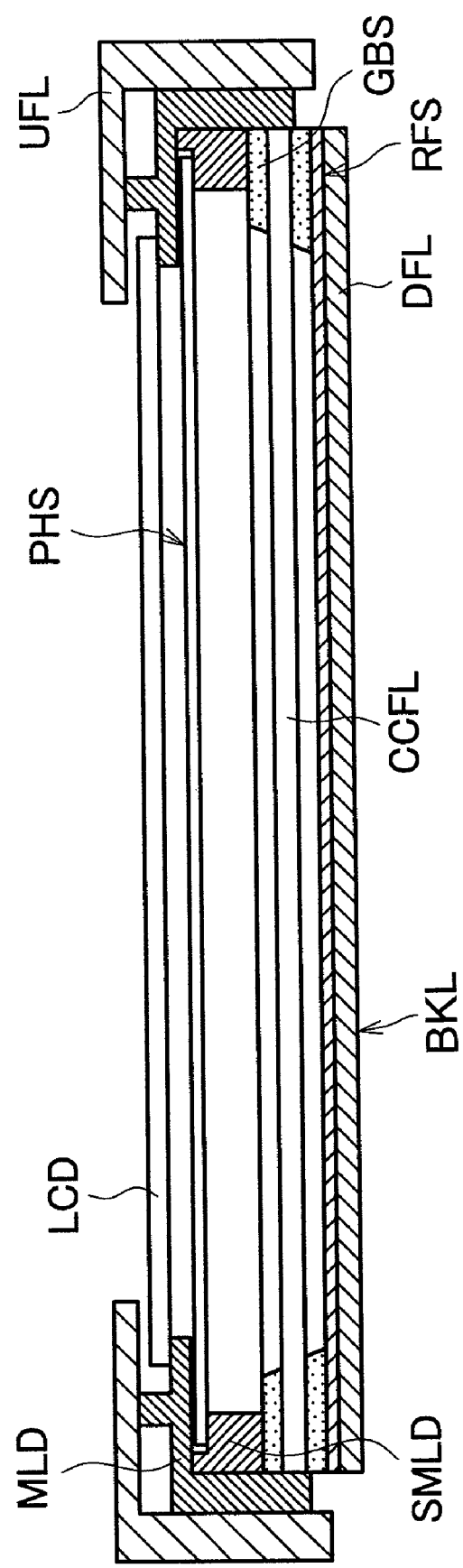
FIG. 1 is a schematic cross-sectional view for explaining a liquid crystal display device of an embodiment 1 according to the present invention.
Figure 2:
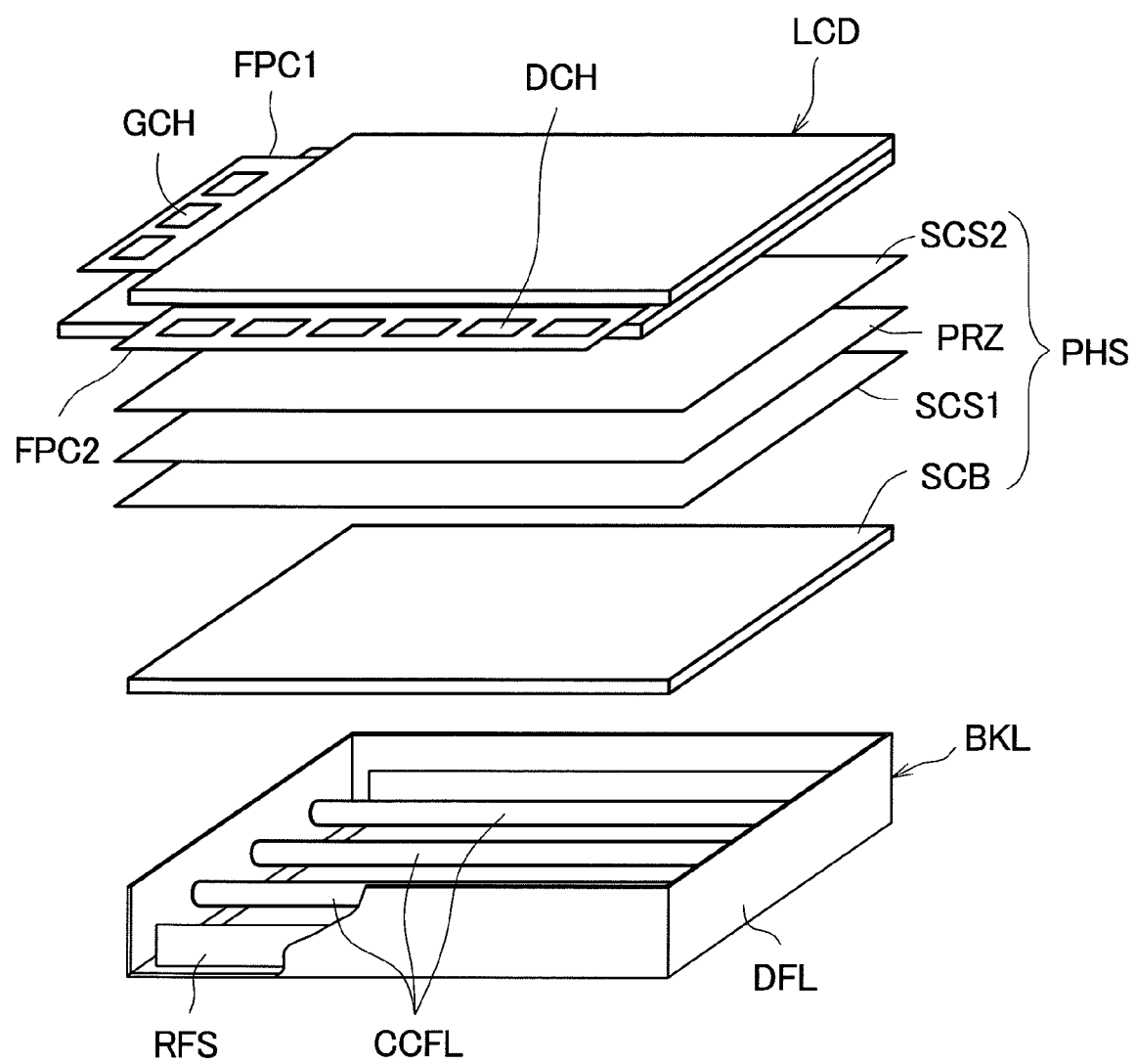
FIG. 2 is a schematic developed perspective view of FIG. 1.

FIG. 1 is a schematic cross-sectional view for explaining the constitution of a liquid crystal display device of one embodiment according to the present invention, and FIG. 2 is a schematic developed perspective view of FIG. 1.

In FIG. 1 and FIG. 2, a liquid crystal display panel LCD is configured such that a liquid crystal layer is sealed between two light-transmitting glass substrates which form electrodes for forming pixels (not shown in the drawing) thereon respectively. Two sides of one glass substrate (also usually referred to as an active matrix substrate) project from another substrate (also usually referred to as a color filter substrate) On the projecting portion of one glass substrate, a flexible printed circuit board FPC1 which mounts a scanning signal line drive circuit chip GCH thereon and a flexible printed circuit board FPC2 which mounts a data signal line drive circuit chip DCH thereon are mounted.

In such a liquid crystal display device, a reflection sheet RFS is installed inside a lower frame DFL, and a plurality of cold cathode fluorescent lamps CCFL is arranged in parallel to each other above the reflection sheet RFS thus constituting a backlight BKL. The constitution of the cold cathode fluorescent lamp CCFL of the backlight BKL is explained later.

The lower frame DFL is formed of a metal-sheet molded body, and has a function of integrating the liquid crystal display panel LCD with an optical compensation sheet stacked body PHS in an overlapping manner with an upper frame UFL formed of a metal sheet in the same manner as the lower frame DFL. In FIG. 2, the upper frame UFL is not shown in the drawing.

Along with the large-sizing of the liquid crystal display panel LCD, in general, a length of the cold cathode fluorescent lamp CCFL in the tube-axis direction is increased. The cold cathode fluorescent lamp CCFL is a fluorescent lamp constituted of a glass tube having a small diameter, and is usually installed in a state that both end portions of the cold cathode fluorescent lamp CCFL are supported by rubber bushings GBS.

Further, in the liquid crystal display device which adopts the direct-type backlight as an illumination device as shown in the drawing, an optical compensation sheet stacked body PHS formed of plural kinds of sheets is installed above the backlight BKL (a space between the backlight BKL and the liquid crystal display panel LCD). The optical compensation sheet stacked body PHS is formed by overlapping a diffusion plate SCB, a first diffusion sheet SCS1, two prism sheets PRZ arranged in an intersecting manner from each other, and a second diffusion sheet SCS2.

The above-mentioned direct-type backlight BKL includes a resin-made side holding frame SMLD referred to as a side mold which is mounted on a side periphery of the lower frame DFL having a bottom and the side periphery, and peripheral ends of the optical compensation sheet stacked body PHS are held by the side holding frame SMLD in a bridging manner.

Further, as shown in the drawing, the backlight BKL which holds a light guide plate GLB and the optical compensation sheet PHS is combined with the liquid crystal display panel LCD using the mold frame MLD, the liquid crystal display panel LCD is covered with the upper frame UFL, the upper frame UFL and the lower frame DFL are joined to each other using engaging members not shown in the drawing thus integrating these parts to constitute the liquid crystal display device. Here, in the liquid crystal display device which adopts the large-sized liquid crystal display panel LCD, the liquid crystal display device may also use a light diffusion plate or a light diffusion sheet.

Figure 3:
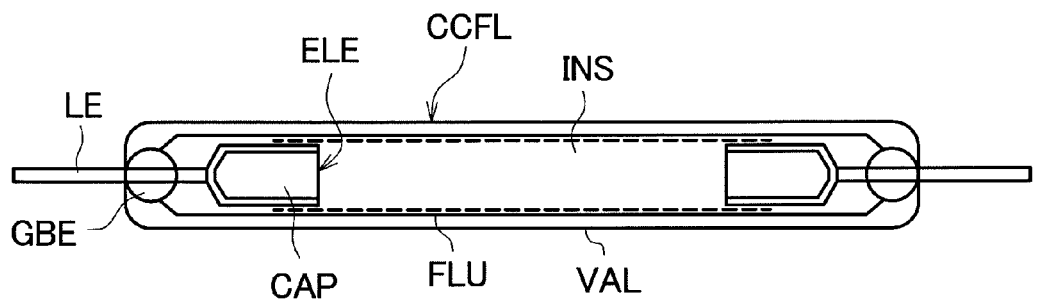
FIG. 3 is a schematic cross-sectional view showing a constitutional example of a cold cathode fluorescent lamp mounted on the liquid crystal display device of the embodiment 1 according to the present invention.

FIG. 3 is an enlarged cross-sectional view of an essential part showing a constitutional example of the above-mentioned cold cathode fluorescent lamp mounted on the liquid crystal display device according to the embodiment 1 of the present invention. In FIG. 3, in the cold cathode fluorescent lamp CCFL, a phosphor film FLU made of rare earth phosphors is formed on an inner peripheral surface of a light-transmitting glass tube VAL by coating. The detailed constitution of the phosphor film FLU and a method of forming the phosphor film FLU are explained later.

A pair of cold cathodes ELE is respectively arranged in the inside of both end sides of the light-transmitting glass tube VAL in a state that the cold cathodes ELE face each other in an opposed manner. Further, after being evacuated, a neon-argon (Ne—Ar) gas which constitutes an inert gas and mercury are sealed in the inside INS of the glass tube VAL.

The pair of cold cathodes ELE is formed such that a cap body CAP which is formed by molding a nickel material, a molybdenum material or the like, for example, into a cup shape using a press forming method, for example, has an opening end thereof directed to a main discharge region, an electricity supply line LE made of nickel-cobalt-iron alloy, for example, having a thermal expansion coefficient which approximates a thermal expansion coefficient of the glass tube VAL abuts on a bottom portion of a rear end of the cup body CAP, and the electricity supply line LE is electrically connected to the cup body CAP by a resistance welding method or a laser welding method, for example.

The electricity supply line LE is supported on and hermetically sealed by glass beads GBE respectively formed on both end portions of the glass tube VAL and hence, the pair of cold cathodes ELE is hermetically sealed to both end portions of the glass tube VAL in a state that the opening ends of the cold cathodes ELE face a main discharge region.

Further, the cold cathode fluorescent lamp CCFL is formed such that a wall thickness of a body of the glass tube VAL is set to approximately several 100 μm, for example, while a wall thickness of both end portions of the glass tube VAL is set to approximately 200 μm to 300 μm. Further, an outer diameter of the glass tube VAL is set to approximately 1.0 mm to 10.0 mm, and a length of the glass tube VAL is set to approximately 50 mm to 800 mm corresponding to a size of the display panel.

In the cold cathode fluorescent lamp CCFL having such a constitution, a power source circuit (in general, an inverter lighting circuit) not shown in the drawing is connected to the pair of electricity supply lines LE so as to supply electricity for lighting between the pair of opposing cold cathodes ELE.

Here, the constitution of the phosphor film FLU formed on the inner peripheral surface of the glass tube VAL described above and the method of forming the phosphor film FLU are explained in detail.

First of all, a solvent which is prepared by mixing butyl acetate and nitrocellulose is filled in the inside of a container, and the solvent is strongly stirred until the solvent acquires approximately ⅓ of initial viscosity using a homogenizer to which explosion-proof treatment is applied.

Next, approximately 40% to 50% of this solvent, approximately 2% to 10% of alumina-based or glass-based binder, approximately 40% to 60% of mixed powder of red, green and blue phosphors, and an additive such as a dispersion holding agent are sufficiently mixed with each other to prepare a phosphor suspension.

Figure 4:
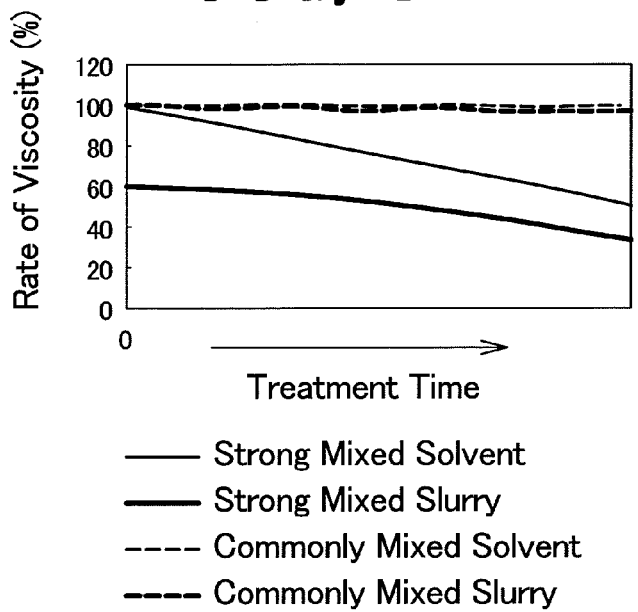
FIG. 4 is a view showing the relationship between the viscosity of a phosphor suspension and a homogenizer treatment time.
Figure 5A:
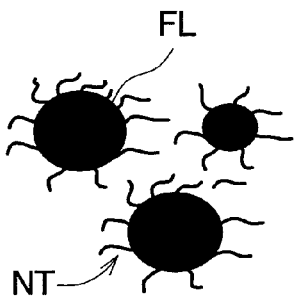
Figure 5B:
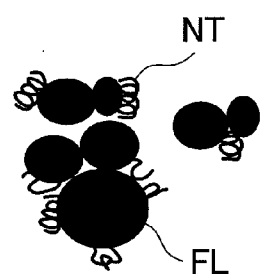

Next, the phosphor suspension is re-stirred using a homogenizer until the phosphor suspension acquires approximately ½ of initial viscosity. FIG. 4 shows the relationship between the viscosity of phosphor suspension and a homogenizer treatment time (assuming initial viscosities of conventional solvent and phosphor suspension as 100%). The viscosity of the phosphor suspension becomes approximately ⅓ of the viscosity of the conventional product. Further, FIG. 5A and FIG. 5B are schematic views showing a state of phosphors in the phosphor suspension. FIG. 5A shows the state of phosphors of the product of the present invention, and FIG. 5B shows the state of phosphors of conventional product.

In case of the phosphor suspension of the product of the present invention shown in FIG. 5A, spreading (steric hindrance effect) of nitrocellulose molecular chains NT attracted to a periphery of a phosphor particle FL is large and hence, the respective individual phosphor particles FL are present in a dispersed state. On the other hand, in case of the phosphor suspension of the conventional product shown in FIG. 5B, the nitrocellulose molecular chains NT are attracted in an entangled state and hence, a plurality of phosphor particles FL is present in an aggregated state.

Next, a clean glass tube is mounted upright on a suction coating apparatus. A container in which the phosphor suspension is filled is placed below the glass tube, and the glass tube is brought into contact with the phosphor solution. When pressure in the glass tube is reduced from above by operating a vacuum pump, the phosphor suspension is elevated, and a suction operation is stopped when the phosphor suspension reaches a predetermined position. After the suction operation is stopped, an extra phosphor suspension drops by gravity and returns to the container. Next, dry air is blown into the glass tube from above at a fixed blow speed so as to dry the inside of the glass tube thus forming a phosphor film. Thereafter, the glass tube is removed from the suction coating apparatus, and the extra phosphor suspension adhered to a lower portion of the glass tube is wiped out.

Thereafter, the glass tube is transferred to the inside of a baking furnace where the glass tube is heated at a temperature of approximately 700° C. for approximately three minutes thus evaporating the solvent and fixing the phosphors. Next, a discharge cold cathode and an electricity supply line are mounted on one opening portion of the glass tube by melting glass. Further, after evacuating the inside of the glass tube from another opening portion using a vacuum evacuating device, an inert gas, mercury and the like for discharging are sealed in the glass tube.

Figure 6:
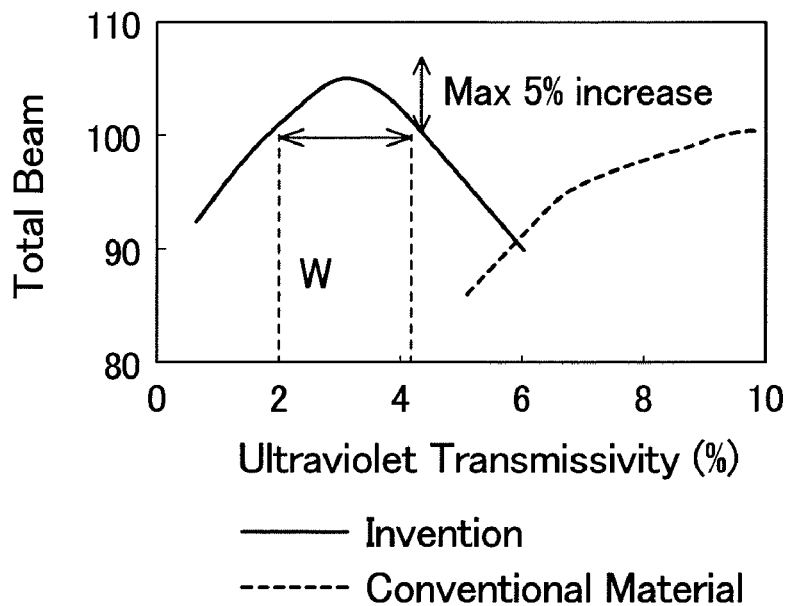
FIG. 6 is a view showing the relationship between a total luminous flux and ultraviolet-ray transmissivity.
Figure 7:
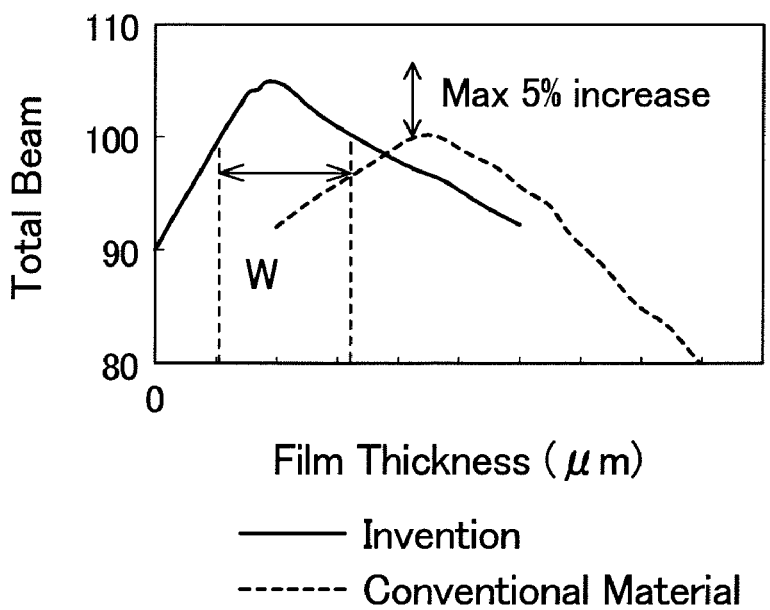
FIG. 7 is a view showing the relationship between the total luminous flux and a film thickness.

A total luminous flux is measured with respect to the cold cathode fluorescent lamp prepared by such a method, and the relationship between the total luminous flux and ultraviolet-ray transmissivity is shown in FIG. 6, and the relationship between the total luminous flux and a film thickness is shown in FIG. 7. As shown in FIG. 6 and FIG. 7, the range in which the product of the present invention can enhance the total luminous flux compared to the conventional product is constituted of a range W where the ultraviolet transmissivity assumes approximately 2% to 4% and a range W where the film thickness assumes approximately 12±2 μm. The total luminous flux of the present invention can be enhanced by approximately 5% at maximum compared to the conventional product. Further, besides the total luminous flux enhancing effect, the cold cathode fluorescent lamp of the present invention can reduce the chrominance in the tube-axis direction to approximately ⅓ of the chrominance in the tube-axis direction of the conventional product, while a film strength of the present invention can be enhanced by approximately 10% compared to the film strength of the conventional product. To summarize the respective properties within such ranges, the characteristics are described as shown in following Table 1.

TABLE 1

| | total luminous flux | ultraviolet-ray transmissivity (%) | film thickness (μm) | irregularities of film thickness (%) | chrominance in tube-axis direction | | film strength |
| --- | --- | --- | --- | --- | --- | --- | --- |
| | | | | | Δx | Δy | |
| product of the present invention | 100-107 | 2-4 | 12 ± 2 | 5 | 0.002 | 0.002 | 110 |
| conventional product | 100 | 9 | 18 | 15 | 0.007 | 0.006 | 100 |

Next, a method of measuring ultraviolet-ray transmissivity of the phosphor film is explained. The glass tube absorbs the ultraviolet rays and hence, with the use of the glass tube in such a state, the ultraviolet-ray transmissivity cannot be accurately measured. Accordingly, phosphor films having various film thicknesses are prepared using a quartz-made glass tube which allows the transmission of the ultraviolet rays. FIG. 6 shows the relationship between transmissivity excluding an amount of light emission when the quartz-made glass tube is cut so as to expose a surface of the phosphor film and ultraviolet rays having a wavelength of approximately 254 nm are radiated from a phosphor-film side and a total luminous flux of a usual glass-tube cold cathode tube prepared at the same time.

As can be clearly understood from FIG. 6, the range in which the product of the present invention can enhance the total luminous flux compared to the conventional product is the range where the ultraviolet-transmissivity assumes approximately 2% to 4%. It is considered that when the ultraviolet-ray transmissivity is less than approximately 2%, as described later, the transmissivity of visible light is low and hence, the pickup efficiency of light emission is lowered whereby the total luminous flux is lowered. On the other hand, it is also considered that when the ultraviolet-ray transmissivity exceeds approximately 4%, the ultraviolet rays are absorbed in the glass tube and hence, the light emission efficiency is lowered whereby the total luminous flux is lowered.

Figure 8:
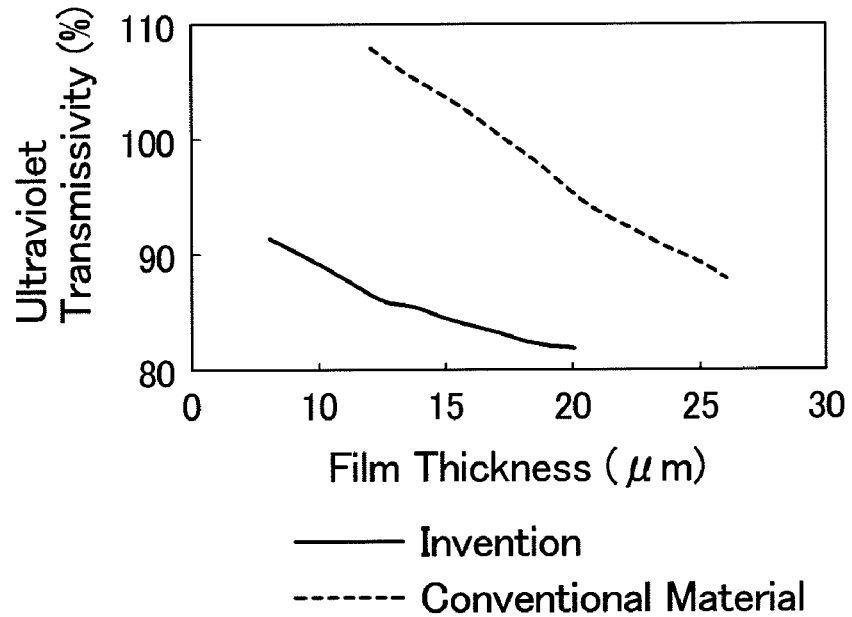
FIG. 8 is a view showing the relationship between ultraviolet-ray transmissivity and a film thickness of a phosphor film.

FIG. 8 shows the relationship between the ultraviolet-ray transmissivity and the film thickness of the phosphor film. As can be understood from FIG. 8, the ultraviolet-ray transmissivity of the product of the present invention completely differs from the ultraviolet-ray transmissivity of the conventional product. That is, it is understood that the product of the present invention can lower the ultraviolet-ray transmissivity in a thin film region.

Further, as another method for measuring the ultraviolet-ray transmissivity of the phosphor film, a method which determines the ultraviolet-ray transmissivity based on visible light positive transmissivity/integral transmissivity is named.

Figure 9:
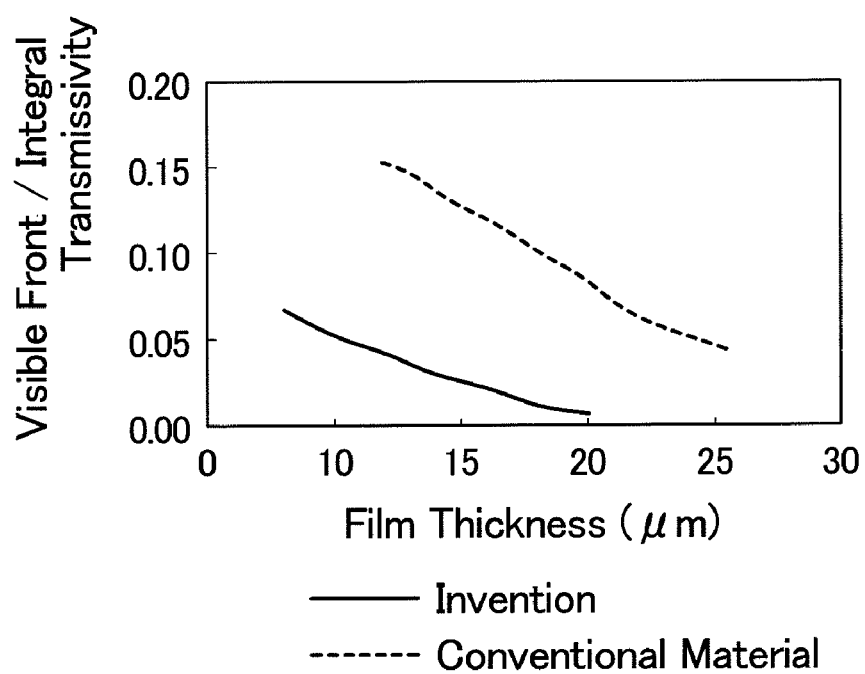
FIG. 9 is a view showing the relationship between visible light positive transmissivity/integral transmissivity and the film thickness.
Figure 10:
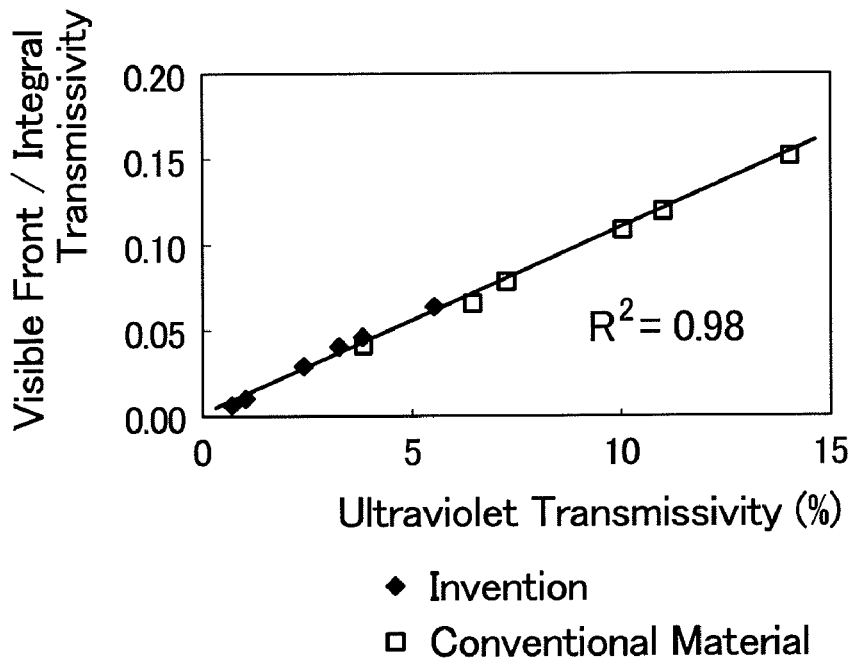
FIG. 10 is a view showing the relationship between ultraviolet-ray transmissivity and visible light positive transmissivity/integral transmissivity.

FIG. 9 shows the relationship between the visible light positive transmissivity/integral transmissivity and the film thickness. Further, FIG. 10 shows the relationship between ultraviolet-ray transmissivity and the visible light positive transmissivity/integral transmissivity. As can be understood from FIG. 10, irrespective of whether the product is the product of the present invention or the conventional product, the ultraviolet-ray transmissivity and the visible light positive transmissivity/integral transmissivity have the proportional relationship and exhibit the high correlation ($R^2=0.98$).

Figure 11:
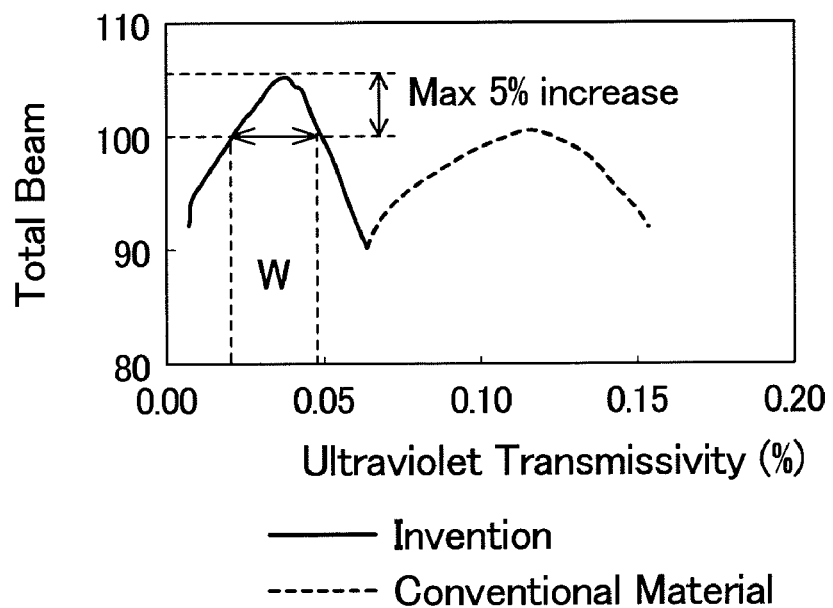
FIG. 11 is a view showing the relationship between visible light positive transmissivity/integral transmissivity and the total luminous flux.

That is, in the mass production control or the analysis of products of other companies, the visible light transmissivity of the glass tube is measured, and the ultraviolet-ray transmissivity of the phosphor film can be determined based on the relationship shown in FIG. 10. The relationship between the visible light positive transmissivity/integral transmissivity and the total luminous flux obtained based on such relationship is shown in FIG. 11. As can be clearly understood from FIG. 11, the product of the present invention can enhance the total luminous flux compared to the conventional product when the visible light positive transmissivity/integral transmissivity falls within a range from 0.02 to 0.05.

FIG. 12 shows the relationship between the brightness of the cold cathode fluorescent lamp and the visible light positive transmissivity/integral transmissivity (film thickness; approximately 12 μm) of the phosphor film when the ratio of phosphors of respective colors consisting of red, green and blue is changed for studying whether or not the visible light transmissivity characteristic is applicable to a white color temperature range. As can be understood from FIG. 12, it is confirmed that the brightness is fixed irrespective of color temperature when the color temperature falls within a range from approximately 500K to 15000K, and the visible light transmissivity is set to an approximately fixed value although the visible light transmissivity is lowered by approximately 1% when the color temperature is high.

FIG. 13A and FIG. 13B are enlarged cross-sectional views of an essential part for observing the distribution of phosphor particles using a microscope after providing a cross section of the phosphor film by cutting the glass tube for studying a cross-sectional state of the phosphor film, wherein FIG. 13A shows the cross-section of the product of the present invention and FIG. 13B shows the cross-section of the conventional product. As shown in FIG. 13A, the product of the present invention shows the distribution of phosphor particles FL with high density compared to the conventional product shown in FIG. 13B. That is, a plurality of phosphor particles having a small particle size is positioned on an interface of the glass tube VAL in an aggregated state in the conventional product, while the phosphor particles FL having a large particle size are arranged in the vicinity of an interface of the glass tube VAL and the phosphor particles having a small particle size are arranged in a dispersed manner in the product of the present invention. Accordingly, a film thickness T of the product of the present invention shown in FIG. 13A is set smaller than a film thickness T of the conventional product shown in FIG. 13B.

Figure 14:
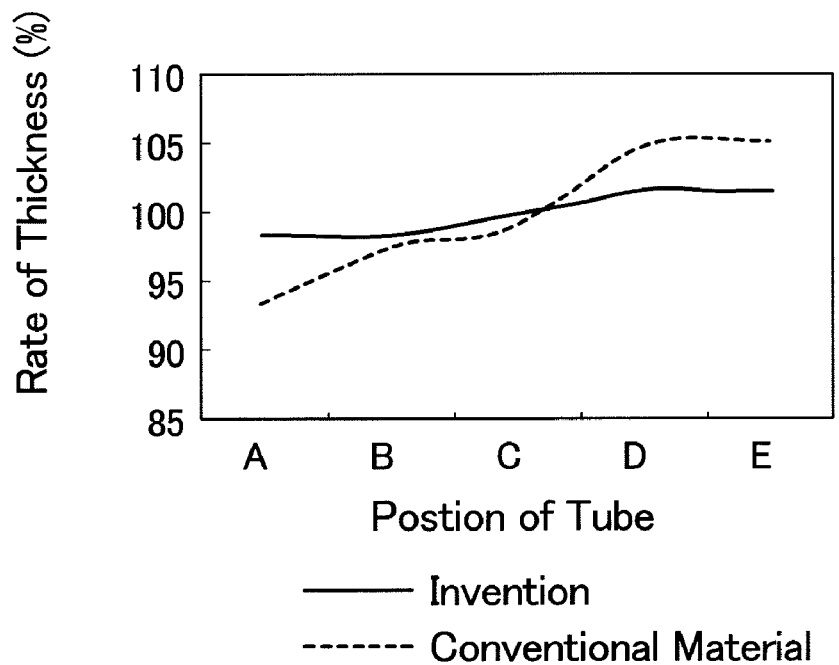
FIG. 14 is a view showing the film thickness distribution of the phosphor film in the tube-axis direction.

FIG. 14 shows the film thickness distribution of the phosphor film in the tube-axis direction, and shows a result of measurement at positions A to E which are distributed by equally dividing the glass tube in five in the tube-axis direction. An average film thickness of the phosphor film is approximately 12 μm, and irregularities of the film thickness of the phosphor film in the tube-axis direction are approximately 5% or less. That is, the product of the present invention is thinner than the conventional product and exhibits more uniform film thickness distribution compared to the conventional product. Accordingly, the chrominance and the irregularities of brightness in the tube-axis direction of the cold cathode fluorescent lamp can be reduced.

Figure 15:
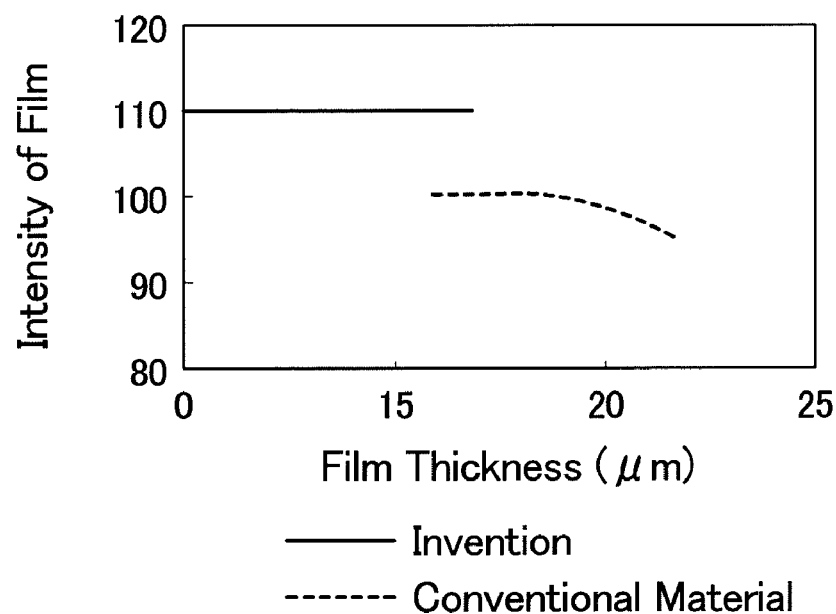
FIG. 15 is a view showing a result of measurement performed using a punching tester with respect to a phosphor-film-mounted glass tube.

FIG. 15 shows a result of measurement for studying strength of the phosphor film in which a glass tube having a phosphor film is subject to heat treatment in a baking furnace and, thereafter, is subject to a beating testing machine. As can be clearly understood from FIG. 15, the strength of the phosphor film of the present invention is increased by approximately 10% compared to the corresponding strength of the conventional product.

Figure 16:
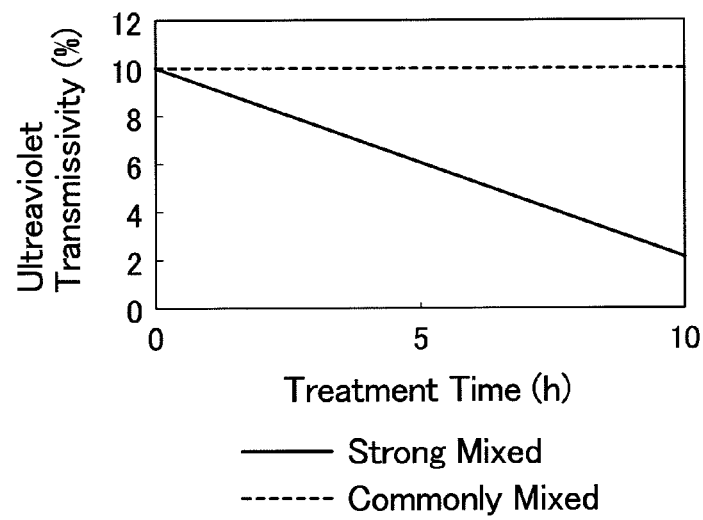
FIG. 16 is a view showing the relationship between a strong stirring time of a solvent and ultraviolet-ray transmissivity of a phosphor film.

FIG. 16 is a view showing the relationship between a strong stirring time of the above-mentioned solvent and the ultraviolet-ray transmissivity of the phosphor film. As can be clearly understood from FIG. 16, along with the prolongation of the stirring time, the entanglement of nitrocellulose is released and hence, a steric hindrance effect is increased whereby the resolution of the phosphors is increased leading to the enhancement of density of the phosphor film and the lowering of the ultraviolet-ray transmissivity.

According to the constitution of the embodiment 1, due to the strong stirring of the mixed solvent made of butyl acetate and nitrocellulose, the affinity between these components is increased thus eliminating the entanglement of nitrocellulose molecular chains NT and hence, a steric hindrance effect which is generated due to the attraction of nitrocellulose molecular chains NT to the phosphor particles FL when the phosphor suspension is produced by mixing the phosphors into the mixed solvent is largely increased whereby the phosphor film FLU with high density can be formed. The ultraviolet-ray transmissivity of the phosphor film FLU of the present invention can be largely reduced compared to the ultraviolet-ray transmissivity of the phosphor film of the conventional product. It is confirmed that the ultraviolet ray absorption efficiency and the visible region light-emission efficiency assume maximum values when the ultraviolet-ray transmissivity is set to approximately 2% to 4% and film thickness of the phosphor film FLU is set to 12±2 μm as shown in FIG. 6 and FIG. 7 and the total luminous flux of the product of the present invention can be increased by approximately 5% compared to the total luminous flux of the conventional product.

Further, the phosphor particles FL which constitute the phosphor film FLU are uniformly brought into contact with each other and are filled with high density and hence, an intermolecular force between the phosphor particles FL is strengthened thus enhancing film strength as shown in Table 1. Further, since the phosphors of three colors consisting of red, green and blue are uniformly dispersed, the occurrence of partial color spots on the cold cathode fluorescent lamp CCFL can be reduced as shown in Table 1. Further, since the thickness of the phosphor film FLU can be made small, the drying time can be shortened leading to the enhancement of productivity.

Embodiment 2

Figure 17:
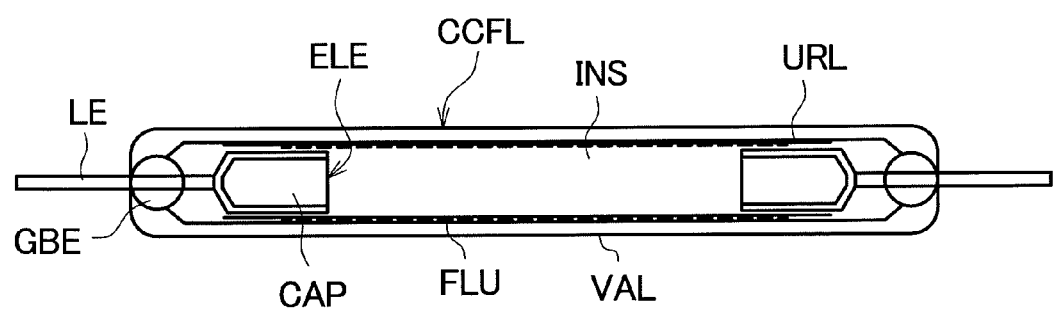
FIG. 17 is an enlarged cross-sectional view showing a constitutional example of a cold cathode fluorescent lamp of an embodiment 2 mounted on a liquid crystal display device.

FIG. 17 is an enlarged cross-sectional view of an essential part showing a constitutional example of a cold cathode fluorescent lamp of the embodiment 2 mounted on the liquid crystal display device of the present invention. In the drawing, parts identical with the parts explained previously in conjunction with FIG. 3 are given the same symbols, and their explanation is omitted. In FIG. 17, the cold cathode fluorescent lamp CCFL is configured such that an ultraviolet-ray reflection film URL having high ultraviolet-ray scattering property is formed on an inner peripheral surface of a light transmitting glass tube VAL by coating, and a phosphor film FLU made of rare earth phosphor is formed on the ultraviolet-ray reflection film URL by coating. The ultraviolet-ray reflection film URL has a coating length thereof set larger than a coating length of the phosphor film FLU in the tube-axis direction on the inner peripheral surface of the glass tube VAL.

Here, with respect to materials which constitute the ultraviolet-ray reflection film URL, the ultraviolet-ray reflection film URL is made of at least one material having a band gap of approximately 5 eV or more (wavelength at optical absorption end being approximately 250 nm or less). As the material having the band gap of 5 eV or more, at least one of $Si_3N_4$, $ZrSiO_4$, $La_2O_3$ and the like, for example, is named. However, provided that the material has the band gap of 5 eV or more, a material such as $Y_2O_3$, MgO, $Al_2O_3$, $ZrO_2$ or the like can be used. Further, a product formed by mixing two or more materials selected from these materials may be also used.

Further, the ultraviolet-ray reflection film URL is formed, in the same manner as the phosphor film FLU, by applying the constituting material of the ultraviolet-ray reflection film URL to the inside INS of the glass tube VAL by a suction coating method and, thereafter, by drying the constituting material by heating.

According to the constitution of the embodiment 2, ultraviolet rays which pass the phosphor layer FLU and are radiated to the outside of the glass tube VAL are reflected and scattered in the inside INS of the glass tube VAL, and are again radiated to the phosphor film FLU. Accordingly, the light emission of the phosphor film FLU is increased and, at the same time, the reflection in a visible light region can be suppressed and hence, a luminous flux of the cold cathode fluorescent lamp CCFL can be further increased.

In this case, assuming the ultraviolet-ray transmissivity of the phosphor layer FLU in the embodiment 1 as 2% to 4%, when approximately 40% of the ultraviolet rays which pass the phosphor layer FLU is considered to be reflected in the inside INS of the glass tube VAL, the total luminous flux can be enhanced. Further, even when the density of phosphor molecules which constitute the phosphor film is relatively small, the shortage of the density can be compensated by the provision of the ultraviolet-ray reflection film URL and hence, a time necessary for homogenizing treatment of the solvent and the phosphor suspension can be shortened.

Further, according to the constitution of the embodiment 2, a coating length of the ultraviolet-ray reflection layer URL on the inner peripheral surface of the glass tube VAL in the tube-axis direction is set larger than a coating length of the phosphor layer FLU in the tube-axis direction and hence, it is possible to scatter and diffuse the reflection of ultraviolet-rays in the inside INS of the glass tube VAL.

The present invention is not limited to the above-mentioned constitution and various modifications are conceivable without departing from the technical concept of the present invention.

Further, although the present invention has been explained in conjunction with the cathode ray fluorescent lamp which is applied to the backlight of the liquid crystal display device, it is needless to say that the present invention is not limited to such a cathode ray fluorescent lamp, and the present invention can acquire the substantially equal advantageous effects even when the present invention is applied to various lighting devices including a fluorescent lamp or the like.

What is claimed is:

1. A liquid crystal display device comprising:
a liquid crystal display panel;
a backlight which radiates illumination light to the liquid crystal display panel; and
a cold cathode fluorescent lamp which constitutes a light source of the backlight; wherein
the cold cathode fluorescent lamp includes a light-transmitting glass tube, a pair of cold cathodes which is respectively arranged at both end portions of the glass tube such that the cold cathodes face each other in an opposed manner, and a phosphor film which is formed on an inner peripheral surface of the glass tube,
the phosphor film is formed such that a phosphor suspension is formed by mixing phosphors into a suspension produced by strongly stirring a mixed solvent made of butyl acetate and nitrocellulose and by re-stirring the mixture, and the phosphor suspension is applied to the inner peripheral surface of the glass tube by coating, and
the phosphor film has an ultraviolet-ray transmissivity of approximately 2% to 4%, and has a film thickness of 12±2 μm.

2. A liquid crystal display device according to claim 1, wherein an ultraviolet-ray reflection film is interposed between the inner peripheral surface of the glass tube and the phosphor film.

3. A liquid crystal display device according to claim 2, wherein the ultraviolet-ray reflection film is formed on the inner surface of the glass tube, and the ultraviolet-ray reflection film has a coating length thereof on the inner peripheral surface of the glass tube in the tube-axis direction set larger than a coating length of the phosphor film on the inner peripheral surface of the glass tube in the tube-axis direction.

4. A liquid crystal display device according to claim 1, wherein the ultraviolet-ray reflection film is formed on the inner surface of the glass tube, and the ultraviolet-ray reflection film is made of a material having a band gap of 5 eV or more.

5. A liquid crystal display device according to claim 1, wherein the backlight radiates illumination light with enhanced brightness in accordance with a lowered ultraviolet-ray transmissivity of the phosphor film providing an enhanced light emission efficiency.

6. A liquid crystal display device comprising:
a liquid crystal display panel;
a backlight which radiates illumination light to the liquid crystal display panel; and
a cold cathode fluorescent lamp which is mounted on the backlight; wherein
the cold cathode fluorescent lamp includes a light-transmitting glass tube, a pair of cold cathodes which is respectively arranged in both end portions of the glass tube such that the cold cathodes face each other in an opposed manner, and a phosphor film which is formed on an inner peripheral surface of the glass tube,
the phosphor film is formed such that a solvent prepared by mixing butyl acetate and nitrocellulose is strongly stirred, phosphor and binder are mixed into the solvent, the solvent is re-stirred thus forming a phosphor suspension, and the phosphor suspension is applied to the inner peripheral surface of the glass tube by suction, and is dried by heating, and
the phosphor film has an ultraviolet-ray transmissivity of approximately 2% to 4%, and has a film thickness of 12±2 μm.

7. A liquid crystal display device according to claim 6, wherein an ultraviolet-ray reflection film is interposed between the inner peripheral surface of the glass tube and the phosphor film.

8. A liquid crystal display device according to claim 7, wherein the ultraviolet-ray reflection film is formed on the inner surface of the glass tube, and the ultraviolet-ray reflection film has a coating length thereof on the inner peripheral surface of the glass tube in the tube-axis direction set larger than a coating length of the phosphor film on the inner peripheral surface of the glass tube in the tube-axis direction.

9. A liquid crystal display device according to claim 6, wherein the ultraviolet-ray reflection film is formed on the inner surface of the glass tube, and the ultraviolet-ray reflection film is made of a material having a band gap of 5 eV or more.

10. A liquid crystal display device according to claim 6, wherein the backlight radiates illumination light with enhanced brightness in accordance with a lowered ultraviolet-ray transmissivity of the phosphor film providing an enhanced light emission efficiency.

* * * * *